United States Patent
Ogawa et al.

(10) Patent No.: US 11,537,507 B2
(45) Date of Patent: Dec. 27, 2022

(54) ENGINE MODEL CONSTRUCTION METHOD, ENGINE MODEL CONSTRUCTING APPARATUS, AND COMPUTER-READABLE RECORDING MEDIUM

(71) Applicant: TRANSTRON INC., Yokohama (JP)

(72) Inventors: Masatoshi Ogawa, Yokohama (JP); Takuma Degawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 17 days.

(21) Appl. No.: 17/374,117

(22) Filed: Jul. 13, 2021

(65) Prior Publication Data
US 2022/0050768 A1 Feb. 17, 2022

(30) Foreign Application Priority Data

Aug. 14, 2020 (JP) .............................. JP2020-137059

(51) Int. Cl.
*G06F 17/00* (2019.01)
*G06F 11/36* (2006.01)
(Continued)

(52) U.S. Cl.
CPC ...... *G06F 11/3684* (2013.01); *G06F 11/3676* (2013.01); *G06F 11/3688* (2013.01);
(Continued)

(58) Field of Classification Search
CPC ............. G06F 11/3684; G06F 11/3676; G06F 11/3688; G06F 11/3692; G06N 3/04; G06K 9/6256
See application file for complete search history.

(56) References Cited

U.S. PATENT DOCUMENTS 6,763,707 B2 7/2004 Kumagai et al.
2003/0004624 A1 1/2003 Wilson et al.
(Continued)

FOREIGN PATENT DOCUMENTS

DE 10 2013 206 297 A1 10/2014
EP 1 409 865 B1 8/2005
(Continued)

OTHER PUBLICATIONS

Narendhar Gugulothu et al., Predicting Remaining Useful Life using Time Series Embeddings based on Recurrent Neural Networks, 2017, [Retrieved on Aug. 18, 2022], Retrieved from the internet: <URL: https://arxiv.org/pdf/1709.01073.pdf> 10 Pages (1-10) (Year: 2017).*
(Continued)

*Primary Examiner* — Anibal Rivera
(74) *Attorney, Agent, or Firm* — Staas & Halsey LLP

(57) ABSTRACT

An engine model construction method includes generating test patterns in which a plurality of manipulated variables used for an engine test are changed with time, correcting the test patterns based on first coverage of a first space of manipulated variables are allowed to take and second coverage of a second space of change rate values of the manipulated variables are allowed to take, acquiring pieces of time series data of operation amounts of the manipulated variables and controlled amounts with respect to the manipulated variables by performing an engine test using the corrected test patterns, and constructing a first engine model by performing machine learning on training data in which the corrected test patterns are adopted as input and the pieces of time series data are adopted as correct answers, by a processor.

24 Claims, 12 Drawing Sheets

(51) Int. Cl.
  *G06K 9/62* (2022.01)
  *G06N 3/04* (2006.01)
(52) U.S. Cl.
  CPC ........ *G06F 11/3692* (2013.01); *G06K 9/6256* (2013.01); *G06N 3/04* (2013.01)

(56) References Cited

U.S. PATENT DOCUMENTS

| | | | |
|---|---|---|---|
| 2004/0231653 | A1 | 11/2004 | Deibert et al. |
| 2005/0046584 | A1* | 3/2005 | Breed ............... B60R 21/01536 340/13.31 |
| 2006/0208169 | A1* | 9/2006 | Breed ................... G01S 7/4802 250/221 |
| 2010/0011763 | A1 | 1/2010 | Komatsu |
| 2011/0000187 | A1 | 1/2011 | Elsässer et al. |
| 2011/0238279 | A1 | 9/2011 | Suetsugu et al. |
| 2016/0047325 | A1 | 2/2016 | Ahlinder |
| 2018/0113963 | A1 | 4/2018 | Kordon et al. |
| 2020/0097775 | A1* | 3/2020 | Zhu .................... G06K 9/00536 |

FOREIGN PATENT DOCUMENTS

| | | |
|---|---|---|
| EP | 1 701 141 A2 | 9/2006 |
| EP | 2 058 493 A1 | 5/2009 |
| JP | 59-74345 A | 4/1984 |
| JP | 2-161501 | 6/1990 |
| JP | 2005-194977 | 7/2005 |
| JP | 2008-64069 | 3/2008 |
| JP | 2011-145081 A | 7/2011 |
| JP | 2016-514785 | 5/2016 |
| JP | 2018-513940 | 5/2018 |
| JP | 2019-125021 A | 7/2019 |

OTHER PUBLICATIONS

Extended European search report dated Dec. 10, 2021 in European Patent Application No. 21184740.5.
Ryan M. Ahmed et al., "Fault detection of an engine using a neural network trained by the smooth variable structure filter", IEEE International Conference on Control Applications, CCA Sep. 28-30, 2011, pp. 1190-1196, XP031976059.
Ivan Arsie et al., "Development and Real-Time Implementation of Recurrent Neural Networks for AFR Prediction and Control", SAE International Journal of Passenger Cars—Electronic and Electrical Systems, Apr. 15, 2009, vol. 1, No. 1, pp. 403-412, XP055756733.
L. Montgomery Smith, "Wideband Bessel function chirp signals and their application to the test and evaluation of audio systems", Mar. 15-17, 2009, 41st Southeastern Symposium on System Theory, IEEE, Piscataway, pp. 355-359, XP031445131.
"Chirp—Wikipedia", http://web.archive.org/web/20200416213829/https://en.wikipedia.org/wiki/Chirp, Retrieved from the Internet on Dec. 2, 2021, pp. 1-6, XP055868385.
Extended European Search Report dated Jan. 7, 2022 from European Application No. 21184738.9.
Office Action dated Aug. 29, 2022 for U.S. Appl. No. 17/375,147.
U.S. Appl. No. 17/375,147, filed Jul. 14, 2021, Masatoshi Ogawa, Transtron Inc..

* cited by examiner

ENGINE MODEL CONSTRUCTION METHOD, ENGINE MODEL CONSTRUCTING APPARATUS, AND COMPUTER-READABLE RECORDING MEDIUM

CROSS-REFERENCE TO RELATED APPLICATION

This application is based upon and claims the benefit of priority of the prior Japanese Patent Application No. 2020-137059, filed on Aug. 14, 2020, the entire contents of which are incorporated herein by reference.

FIELD

The embodiments discussed herein are related to an engine model construction method, a program, and an apparatus.

BACKGROUND

An engine test for a vehicle has been performed in which an manipulated variable used for the test is changed with time by a Chirp signal. In the engine test using the Chirp signal, the manipulated variable is changed to perform a test with high coverage.

SUMMARY

According to an aspect of the embodiments, an engine model construction method includes: generating test patterns in which a plurality of manipulated variables used for an engine test are changed with time; correcting the test patterns based on first coverage of a first space of manipulated variables are allowed to take and second coverage of a second space of change rate values of the manipulated variables are allowed to take; acquiring pieces of time series data of operation amounts of the manipulated variables and controlled amounts with respect to the manipulated variables by performing an engine test using the corrected test patterns; and constructing a first engine model by performing machine learning on training data in which the corrected test patterns are adopted as input and the pieces of time series data are adopted as correct answers, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in the engine test that is performed from construction to evaluation of a controller needs to be repeated when a desired response to control is not obtained, so that a large amount of test man-hours is needed.

In one aspect, the embodiments provide an engine model construction method, an engine model constructing apparatus, and a computer-readable recording medium capable of providing an engine model for performing an engine test with reduced test man-hours.

Preferred embodiments will be explained with reference to accompanying drawings. The present invention is not limited by the embodiments below. In addition, the embodiments may be combined appropriately as long as no contradiction is derived.

First Embodiment

Functional configuration of constructing apparatus 100

Figure 1:
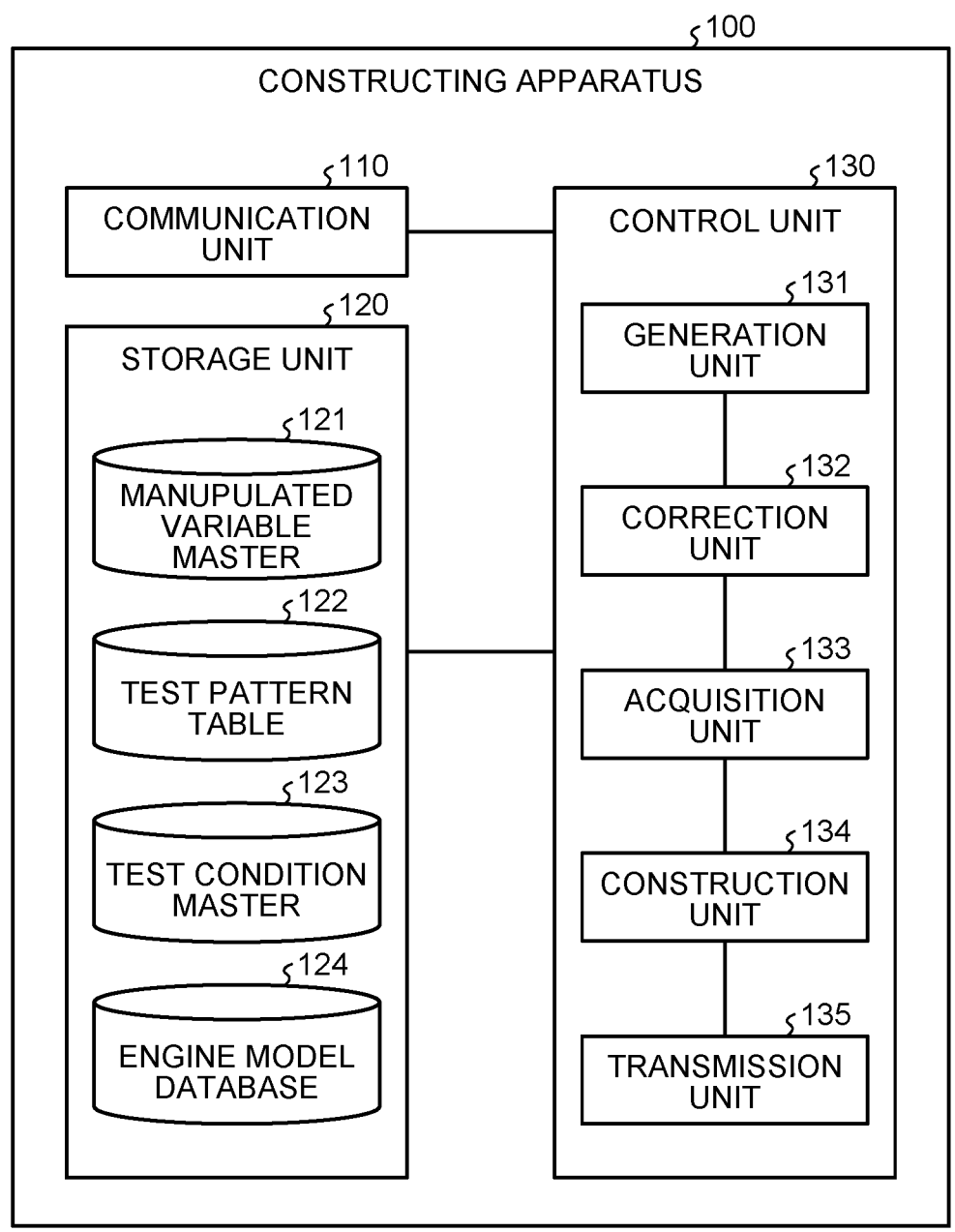
FIG. 1 is a functional block diagram illustrating a functional configuration of a constructing apparatus 100 according to a first embodiment.

First, a functional configuration of a constructing apparatus 100 that implements an engine model construction method disclosed in the present application will be described. FIG. 1 is a functional block diagram illustrating the functional configuration of the constructing apparatus 100 according to the first embodiment. As illustrated in FIG. 1, the constructing apparatus 100 includes a communication unit 110, a storage unit 120, and a control unit 130.

The communication unit 110 is a processing unit that controls communication with other apparatuses, and is, for example, a communication interface.

The storage unit 120 is one example of a storage device that stores therein various kinds of data and a program executed by the control unit 130 and is, for example, a memory, a hard disk, or the like. The storage unit 120 stores therein an manipulated variable master 121, a test pattern table 122, a test condition master 123, and an engine model database (DB) 124.

The manipulated variable master 121 is a master that stores therein information on an manipulated variable that is used for an engine test. The manipulated variable master 121 is able to store therein, for example, for each of engine tests, an manipulated variable to be used, a range of values of the manipulated variable are allowed to take, coverage of the manipulated variable, and the like in an associated manner.

The test pattern table 122 is a table that stores therein information on a Chirp signal that is generated and corrected by the constructing apparatus 100. The test pattern table 122 is able to store therein, for example, for each of the engine tests, the generated Chirp signal, the corrected Chirp signal, and the like in an associated manner.

The test condition master 123 is a master that stores therein information on a test condition for performing a high-safety engine test. The test condition master 123 is able to store therein, for example, for each of the engine tests, a range of a combination of manipulated variables that need to be avoided, a change rate value of an manipulated variable, and the like in an associated manner.

The engine model DB 124 is a database that stores therein information on an engine model and a design model that are constructed by the constructing apparatus 100. Here, the design model is a second engine model that is generated by using the engine model in order to cause the engine model to operate on a prediction controller that predicts an manipulated amount of each of manipulated variables of an engine. Meanwhile, the engine model DB 124 is able to store therein a model parameter for constructing the engine model or the design model.

Meanwhile, the above-described configuration is one example, and the storage unit 120 is able to store therein various kinds of information in addition to the tables and the masters as described above.

The control unit 130 is a processing unit that controls the entire constructing apparatus 100 and is, for example, a processor or the like. The control unit 130 includes a generation unit 131, a correction unit 132, an acquisition unit 133, a construction unit 134, and a transmission unit 135. Meanwhile, each of the processing units is one example of an electronic circuit included in the processor and one example of a process performed by the processor.

The control unit 130 controls the generation unit 131, the correction unit 132, the acquisition unit 133, the construction unit 134, and the like, and constructs an engine model for performing an engine test with reduced test man-hours.

Figure 2:
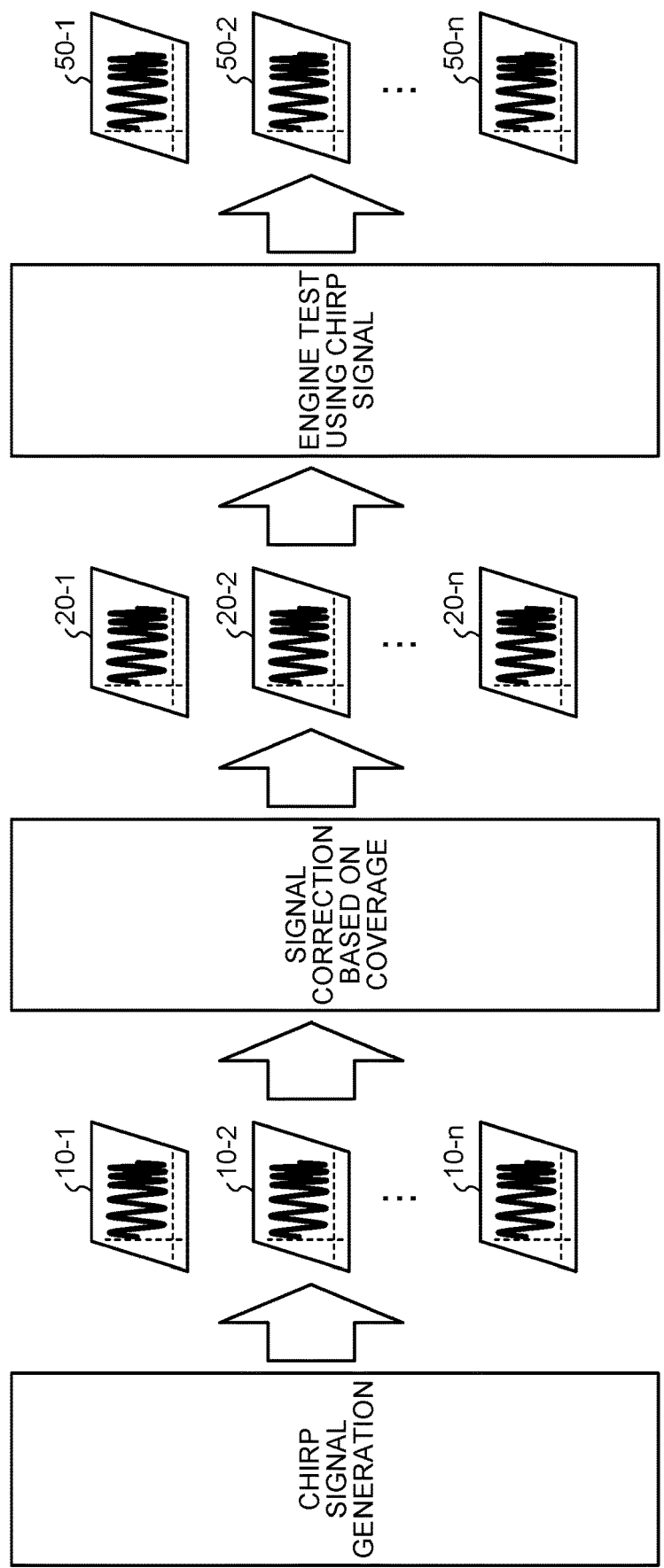
FIG. 2 is a diagram illustrating an example of an engine test using a Chirp signal according to the first embodiment.

An engine test using a Chirp signal will be described. FIG. 2 is a diagram illustrating an example of the engine test using the Chirp signal. The Chirp signal used for the engine test is data indicating a temporal change of an manipulated variable used in the engine test, that is, a test pattern. The Chirp signal as described above is present for each of manipulated variables.

The manipulated variable used in the engine test is, in particular, an amount of fuel consumption, an exhaust gas recirculation (EGR) rate, an opening degree of a turbine, an opening degree of an intake throttle (ITH), or the like. Further, in the present specification, the manipulated variable may simply be referred to as a variable.

In the example in FIG. 2, first, Chirp signals 10-1 to 10-*n* are generated for respective manipulated variables 1 to n (n is an arbitrary integer). For example, if five manipulated variables are used in an engine test, the Chirp signals 10-1 to 10-5 are generated.

Subsequently, the generated Chirp signals 10-1 to 10-*n* are corrected to Chirp signals 20-1 to 20-*n* in order to maximize both of coverage of a space of the manipulated variables 1 to n are allowed to take and coverage of a space of change rate values of the manipulated variables 1 to n are allowed to take. The change rate values of the manipulated variables are values indicating rates at which the manipulated variables are changed. Some manipulated variables may lead a dangerous state if the manipulated variables are rapidly changed during an engine test, for example. Details of a process of correcting the Chirp signals based on the coverage will be described later.

Subsequently, an engine test is performed using the corrected Chirp signals 20-1 to 20-*n*, and pieces of time series data 50-1 to 50-*n* with respect to manipulated amounts of the manipulated variables 1 to n and controlled amounts 1 to n with respect to the manipulated variables 1 to n are acquired.

Then, the constructing apparatus 100 constructs an engine model by performing machine learning on training data, in which the Chirp signals 20-1 to 20-*n* that are test patterns used for the engine test are adopted as input and the pieces of acquired time series data 50-1 to 50-*n* are adopted as correct answers. With use of the engine model as described above, it is possible to predict time series data of a controlled amount with respect to a certain manipulated variable when the certain manipulated variable is changed with time.

Meanwhile, in the example in FIG. 2, the Chirp signals 10-1 to 10-*n* and the corrected Chirp signals 20-1 to 20-*n* are represented by the same waveforms, but the waveforms are mere imaginary images, and in reality, the Chirp signals may have different waveforms. Furthermore, it is not always needed for the constructing apparatus 100 to perform all of processes of generating and correcting the Chirp signals and processes of performing the engine test, but a different apparatus may be used to execute each of the processes.

The generation unit 131 generates a test pattern in which a plurality of manipulated variables used for the engine test are changed with time. Specifically, for example, the generation unit 131 generates, for the plurality of manipulated variables 1 to n, the Chirp signals 10-1 to 10-*n* that change the respective manipulated variables with time, based on the manipulated variables and ranges of values of the manipulated variables are allowed to take, which are stored in the manipulated variable master 121.

Figure 3:
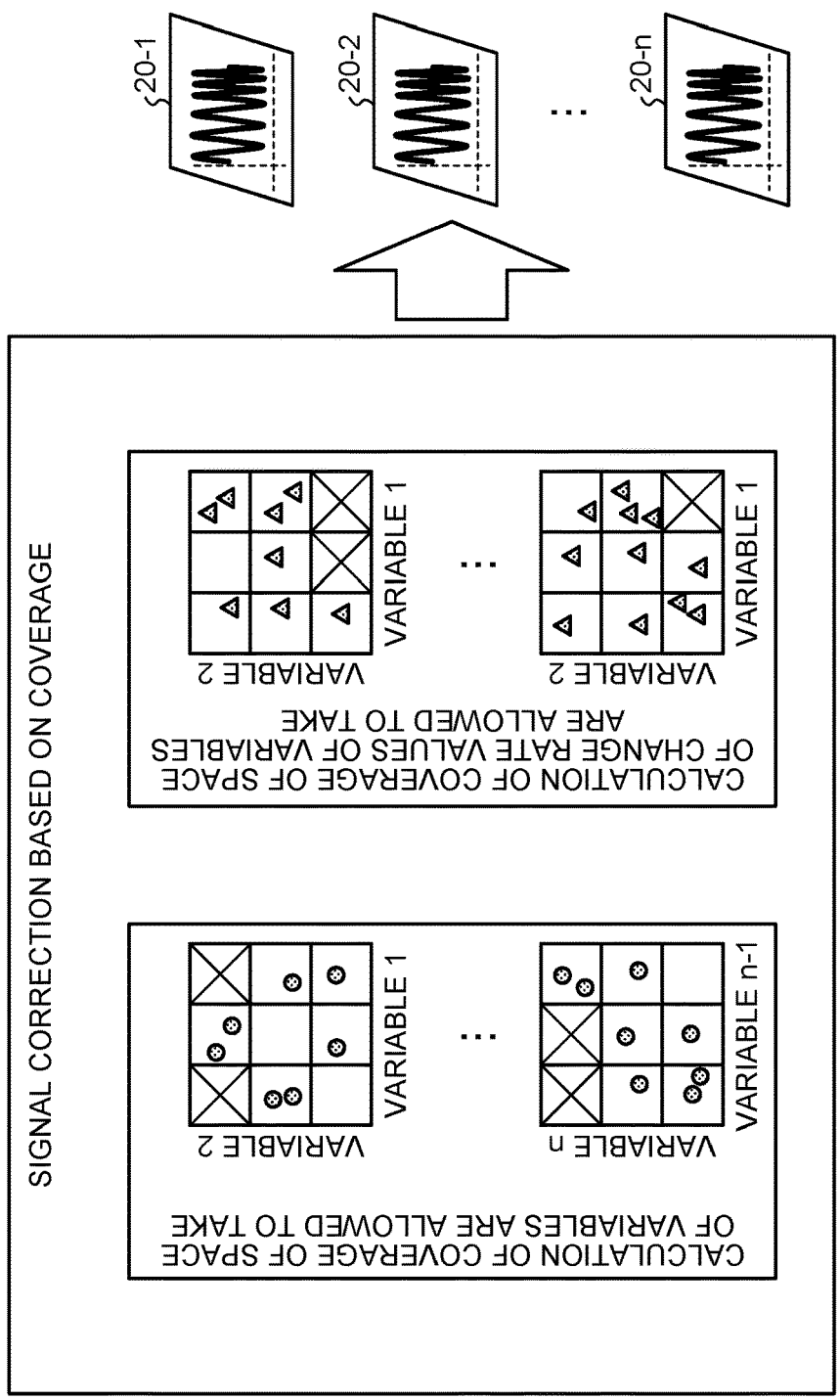
FIG. 3 is a diagram illustrating an example of signal correction based on coverage according to the first embodiment.

The correction unit 132 corrects the test pattern generated by the generation unit 131, based on first coverage of a first space of manipulated variables are allowed to take and second coverage of a second space of change rate values of the manipulated variables are allowed to take. FIG. 3 is a diagram illustrating an example of signal correction based on the coverage according to the first embodiment. As illustrated in FIG. 3, the correction unit 132 corrects the Chirp signals 10-1 to 10-*n* generated by the generation unit 131 in such a manner that both of the coverage of the space of the manipulated variables 1 to n are allowed to take and the coverage of the change rate values of the manipulated variables 1 to n are allowed to take are maximized.

The space of the manipulated variables 1 to n are allowed to take is, for example, a coordinate space of combinations of the manipulated variables are allowed to take as illustrated in FIG. 3. The coordinate space will be described by using a coordinate space of combinations of the manipulated variable 1 are allowed to take and the manipulated variable 2 are allowed to take as an example. The coverage increases as the coordinate space is more evenly covered by the combinations of the manipulated variable 1 and the manipulated variable 2 with use of the Chirp signals that represent temporal changes of the respective manipulated variables. In this manner, the Chirp signals are corrected so as to increase the coverage of the space of the manipulated variables are allowed to take.

The coverage of the space of the manipulated variables are allowed to take is calculated by, for example, as illustrated in FIG. 3, dividing the coordinate space into a plurality of regions and calculating a ratio of existence and non-existence of combinations of the manipulated variables.

Furthermore, as indicated by a mark x in FIG. 3, a region that needs to be avoided may be present depending on the combinations of the manipulated variables. Therefore, the correction unit 132 first excludes the region as described above from the coordinate space, and thereafter corrects the Chirp signals such that the combinations of the manipulated variables are not included in the region.

The space of the change rate values of the manipulated variables 1 to n are allowed to take is the same as the space of the manipulated variables 1 to n are allowed to take as described above. As described above, the correction unit 132 corrects the Chirp signals 10-1 to 10-n to the Chirp signals 20-1 to 20-n such that both of the coverage of the space of the manipulated variables are allowed to take and the coverage of the space of the change rate values of the manipulated variables are allowed to take are maximized.

Figure 4:
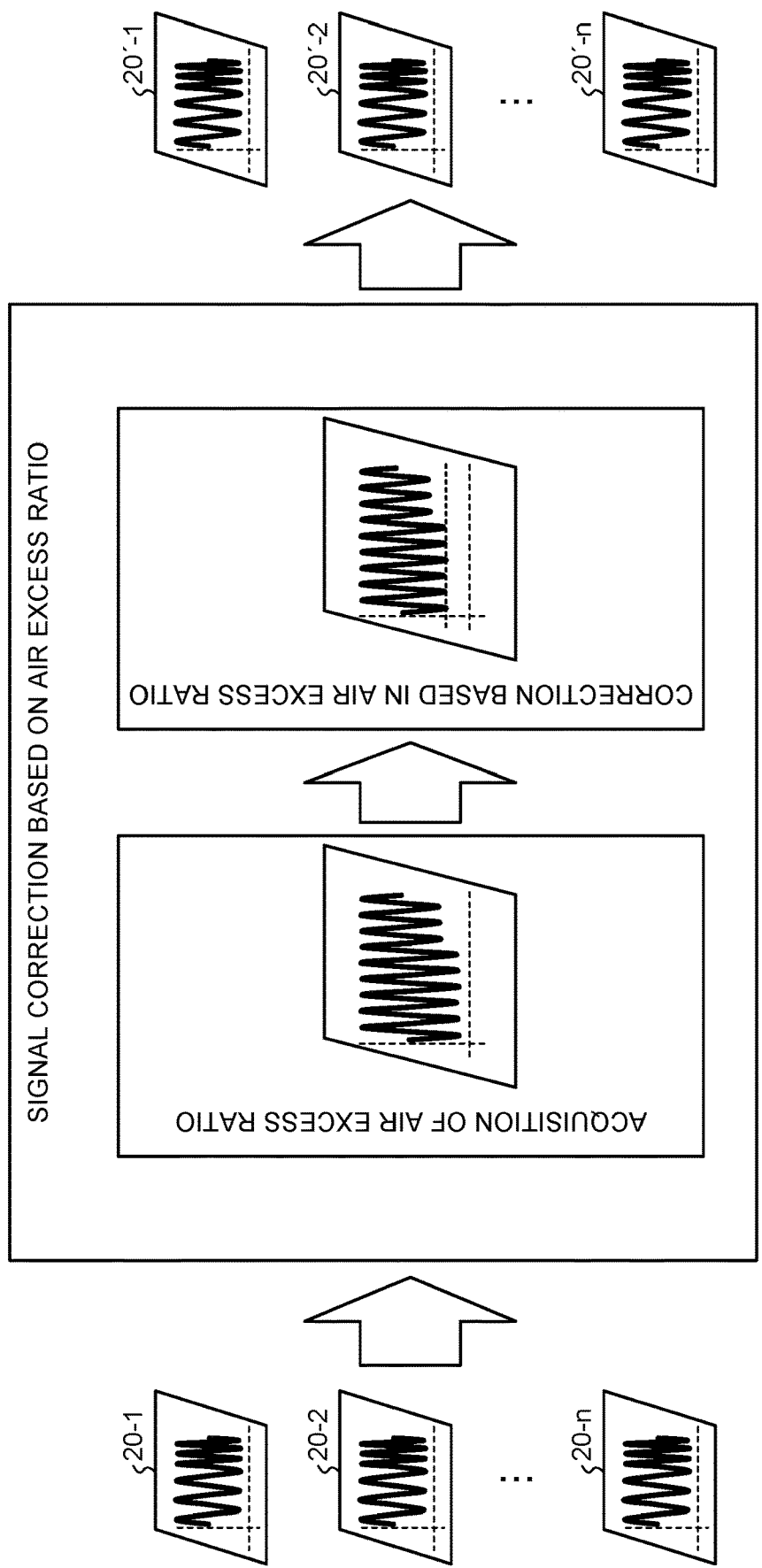
FIG. 4 is a diagram illustrating an example of signal correction based on an air excess ratio according to the first embodiment.

Furthermore, the correction unit 132 is able to further correct the test pattern based on an air excess ratio. FIG. 4 is a diagram illustrating an example of signal correction based on the air excess ratio according to the first embodiment. As illustrated in FIG. 4, the correction unit 132 corrects the Chirp signals 20-1 to 20-n such that the air excess ratio does not fall below a predetermined threshold.

The air excess ratio is obtained by, for example, dividing quantity of air sucked in by an engine by theoretical quantity of air with which supplied fuel is completely combusted. If the air excess ratio falls below the predetermined threshold, such as 1.0, incomplete combustion occurs, so that the engine is operated in an abnormal state in which carbon monoxide and black exhaust increase. Furthermore, the air excess ratio is influenced by an amount of fuel consumption, an EGR rate, an opening degree of a turbine, an opening degree of an intake throttle, or the like. Therefore, the correction unit 132 determines a lower limit to prevent the air excess ratio from falling below the predetermined threshold, and corrects each of the manipulated variables, that is, each of the Chirp signals 20-1 to 20-n, to each of Chirp signals 20'-1 to 20'-n.

Meanwhile, if the air excess ratio exceeds the predetermined threshold, air is supplied more than is needed, so that an exhaust gas heat loss increases. Therefore, the correction unit 132 may further determine an upper limit of the air excess ratio and correct the Chirp signals such that the air excess ratio is maintained in a predetermined range.

Furthermore, the correction unit 132 is able to correct the Chirp signals based on legal limits of exhaust gas components, such as hydrocarbon (HC), carbon monoxide (CO), and nitrogen oxide (NOx), such that concentration of each of the components does not exceed each of the legal limits. Correction of the Chirp signals based on the legal limits of the exhaust gas components may be performed in addition to or in place of correction of the Chirp signals based on the air excess ratio.

Chirp signals that are obtained by further correcting the Chirp signals 20-1 to 20-n based on the air excess ratio or the legal limits of the exhaust gas components are referred to as the Chirp signals 20'-1 to 20'-n. Further, in the following descriptions about engine model construction or the like, the Chirp signals represented as the Chirp signals 20-1 to 20-n may be replaced with the Chirp signals 20'-1 to 20'-n.

The acquisition unit 133 performs an engine test using the corrected test patterns, and obtains the pieces of time series data 50-1 to 50-n of the manipulated amounts of the manipulated variables 1 to n and the controlled amounts with respect to the manipulated variables 1 to n. Meanwhile, the engine test to be performed may be a test using an engine real machine or a virtual test using a virtual engine.

Figure 5:
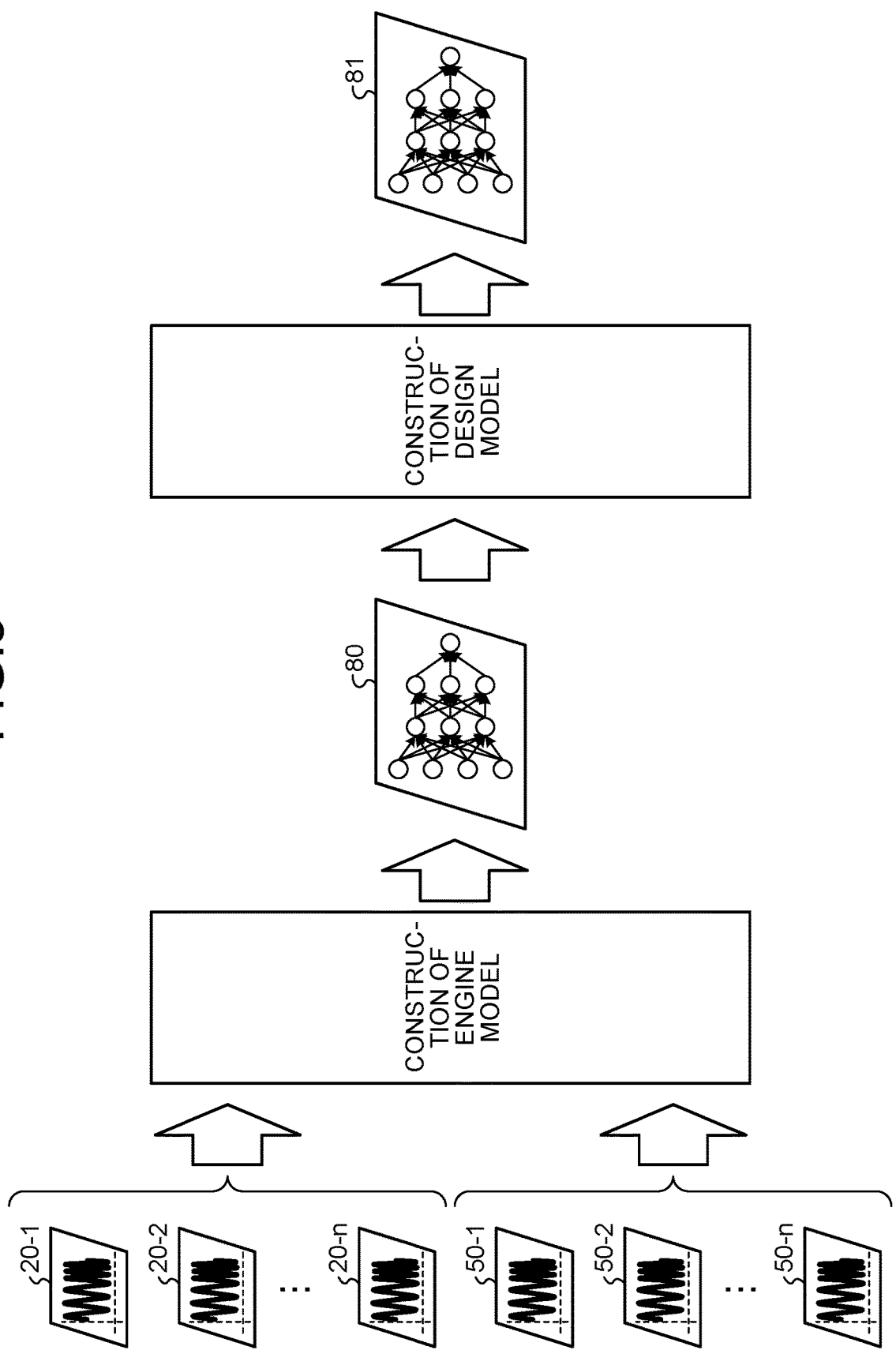
FIG. 5 is a diagram illustrating an example of engine model construction according to the first embodiment.

The construction unit 134 constructs an engine model by performing machine learning on training data, in which the corrected test patterns are adopted as input and the pieces of time series data are adopted as correct answers. FIG. 5 is a diagram illustrating an example of the engine model construction according to the first embodiment. As illustrated in FIG. 5, an engine model 80 is constructed based on the Chirp signals 20-1 to 20-n that are the test patterns corrected by the correction unit 132 and the pieces of time series data 50-1 to 50-n that are acquired by the acquisition unit 133. Accordingly, by inputting a Chirp signal as an manipulated variable, the engine model 80 is able to predict and output time series data of a controlled amount with respect to the manipulated variable in a case where the engine is operated by the Chirp signal.

Figure 6:
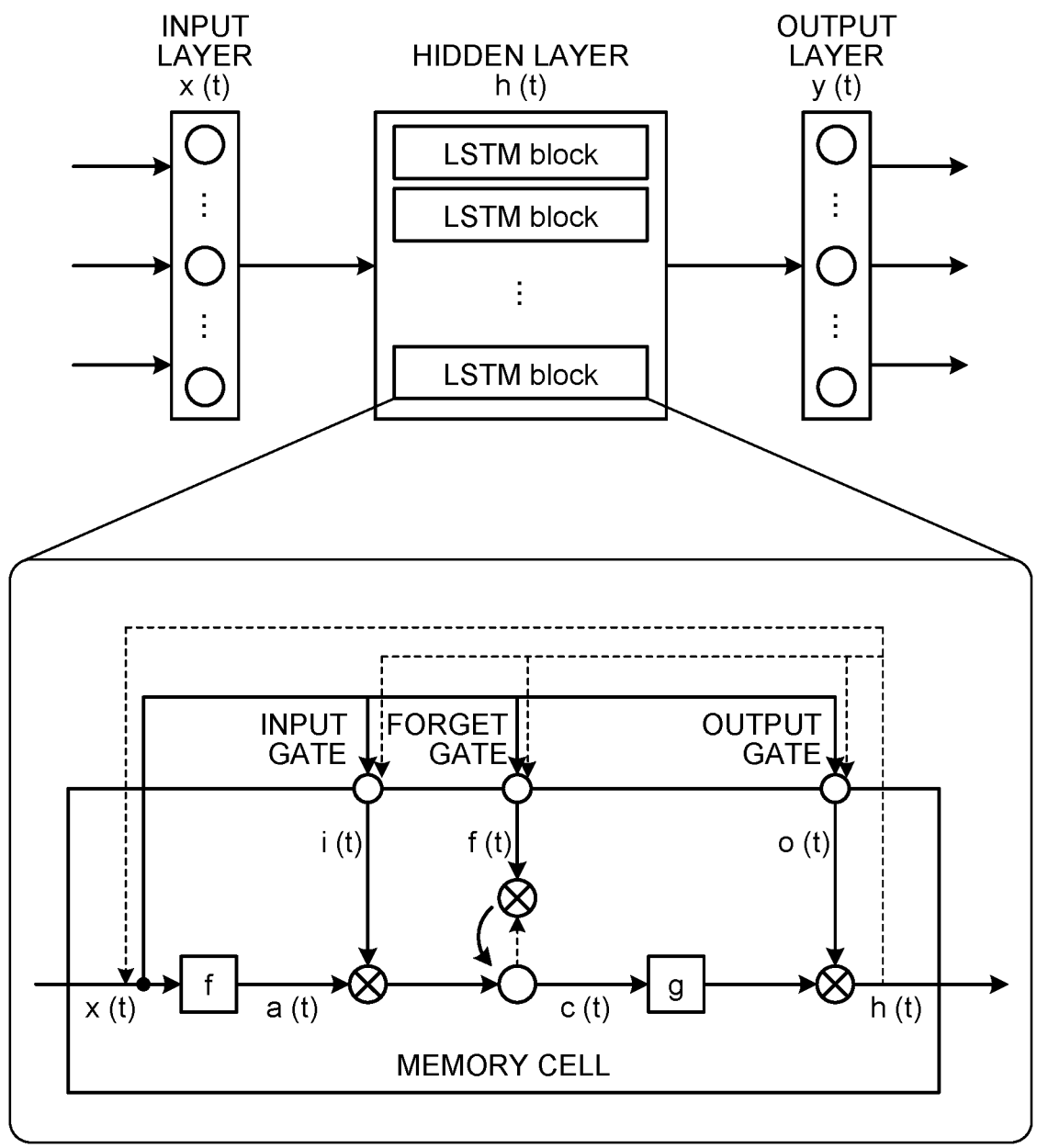
FIG. 6 is a diagram illustrating an example of an engine model according to the first embodiment.

The engine model 80 is, for example, a machine learning model based on a recurrent neural network (RNN) or a long short term memory (LSTM) with two or more intermediate layers (hidden layers). FIG. 6 is a diagram illustrating an example of the engine model according to the first embodiment. The example in FIG. 6 illustrates a structure of an LSTM model. The LSTM is able to learn long-term dependencies in addition to short-term dependencies by replacing intermediate layer units of an RNN with memories called LSTM Blocks and three gates, and is able to predict the controlled amount with respect to each of the manipulated variables in the engine test with high accuracy.

Each of parameters in FIG. 6 is calculated by Expressions (1) to (6) below.

$$c(t)=i(t)\odot a(t)+f(t)\odot c(t-1) \quad (1)$$

$$i(t)=\sigma(i(t))=\sigma(W_i x(t)+U_i h(t-1)+b_i) \quad (2)$$

$$o(t)=\sigma(o(t))=\sigma(W_o x(t)+U_o h(t-1)+b_o) \quad (3)$$

$$f(t)=\sigma(f(t))=\sigma(W_f x(t)+U_f h(t-1)+b_f) \quad (4)$$

$$a(t)=f(\hat{a}(t))=f(W_a x(t)+U_a h(t-1)+b_a) \quad (5)$$

$$h(t)=o(t)\odot g(c(t)) \quad (6)$$

Here, s represents a sigmoid function, b represents bias, W represents input weight, U represents regression weight, and f and g represent hyperbolic tangent functions (tanh).

With use of the engine model 80 as described above, it is possible to predict, from the Chirp signal that indicates a temporal change of a certain manipulated variable, time series data of the controlled amount with respect to the certain manipulated variable in a case where the engine is operated by the Chirp signal. Therefore, by using the engine model 80 for the engine test and determining an manipulated amount of the manipulated variable that is a model input value such that a controlled amount of a model output value follows a control target value, it is possible to perform the engine test with high coverage and reduced test man-hours.

Referring back to FIG. 5, the construction unit 134 generates a design model 81 that is another model by using the engine model 80, in order to operate the engine model on a model predictive controller that determines an manipulated amount of each of manipulated variables of the engine. The design model 81 is generated by using, for example, a mathematical expression based on physics for calibrating a model parameter of the engine model 80. Furthermore, the design model 81 may be generated by linearizing the engine model 80. The design model 81 is also a machine learning model based on an RNN or an LSTM, similarly to the engine model 80.

The transmission unit 135 transmits the design model 81 generated by the construction unit 134 to the model predictive controller that determines the manipulated amount of each of the manipulated variables of the engine by using the design model 81.

Figure 7:
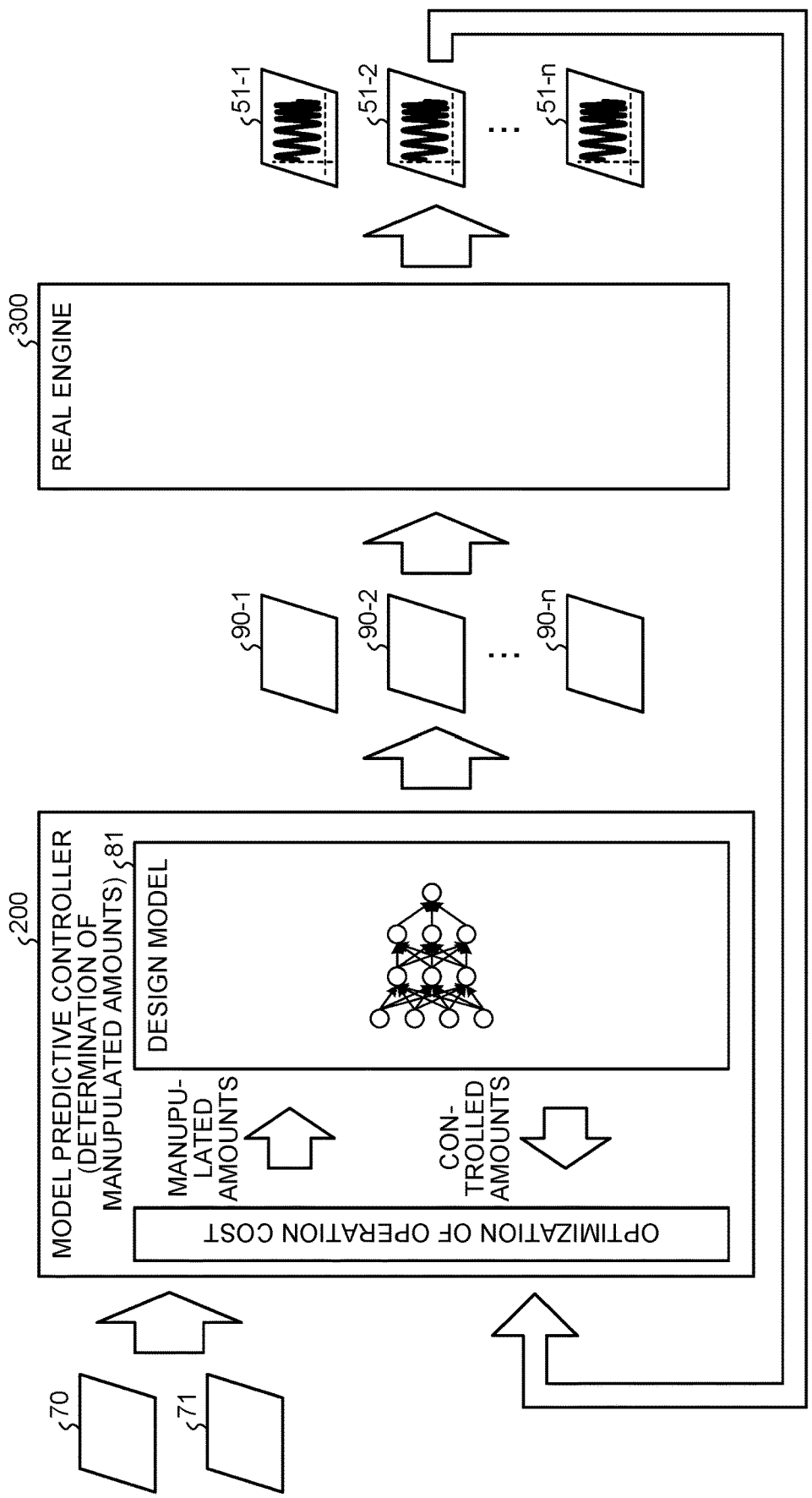
FIG. 7 is a diagram illustrating an example of model predictive control according to the first embodiment.

Next, determination of the manipulated amounts by the model predictive controller and control of the engine test based on the determined manipulated amounts will be described. FIG. 7 is a diagram illustrating an example of model predictive control according to the first embodiment.

In the example in FIG. 7, a prediction controller 200 as one example of the model predictive controller optimizes an operation cost by using the design model 81, and determines manipulated amounts 90-1 to 90-$n$ of the respective manipulated variables 1 to n of the engine.

First, the prediction controller 200 inputs the manipulated amounts 90-1 to 90-$n$ of the respective manipulated variables 1 to n of the engine to the design model 81, and acquires controlled amounts with respect to the manipulated variables. Then, a cost function J, in which a response to a control target value 71 or the like is taken into account, is calculated using Expression (7) below for example, and the manipulated amount of each of the manipulated variables is determined such that the operation cost is minimized.

$$J(k) = \sum_{i=0}^{p-1} ([y(k+i+1|k) - r(k+i+1|k)]^T Q[y(k+i+1|k) - r(k+i+1|k)] + \Delta u(k+i|k)^T R_{\Delta u} \Delta u(k+i|k)) \quad (7)$$

Here, p is a future constant period in which prediction is taken into account, Q and $R_{\Delta u}$ are weight coefficients, u is an manipulated amount, $\Delta u$ is a change amount of the manipulated amount, r is the control target value 71, and y is controlled amounts 51-1 to 51-$n$.

Then, a real engine 300 is controlled using the manipulated amounts 90-1 to 90-$n$ with which the operation cost is minimized.

Figure 8:
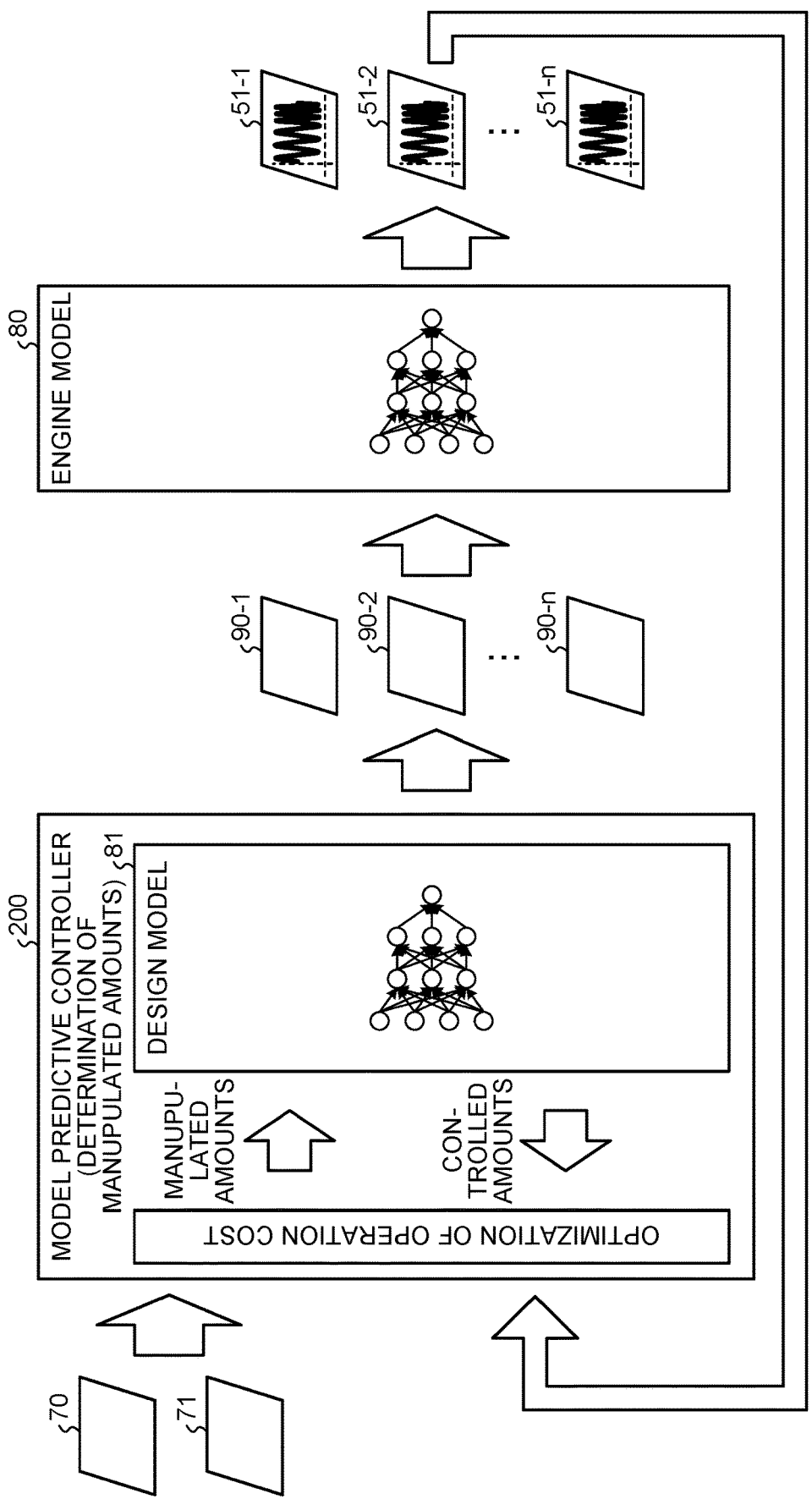
FIG. 8 is a diagram illustrating another example of the model predictive control according to the first embodiment.

Meanwhile, the engine test may be a virtual test using the engine model 80, instead of the real engine 300. FIG. 8 is a diagram illustrating another example of the model predictive control according to the first embodiment. A process performed by the prediction controller 200 in FIG. 8 is the same as the process performed by the prediction controller 200 as described above with reference to FIG. 7. In the example illustrated in FIG. 8, the engine model 80 is controlled by using the manipulated amounts 90-1 to 90-$n$ determined by the prediction controller 200, and then the engine test is performed.

Flow of Process

Figure 9:
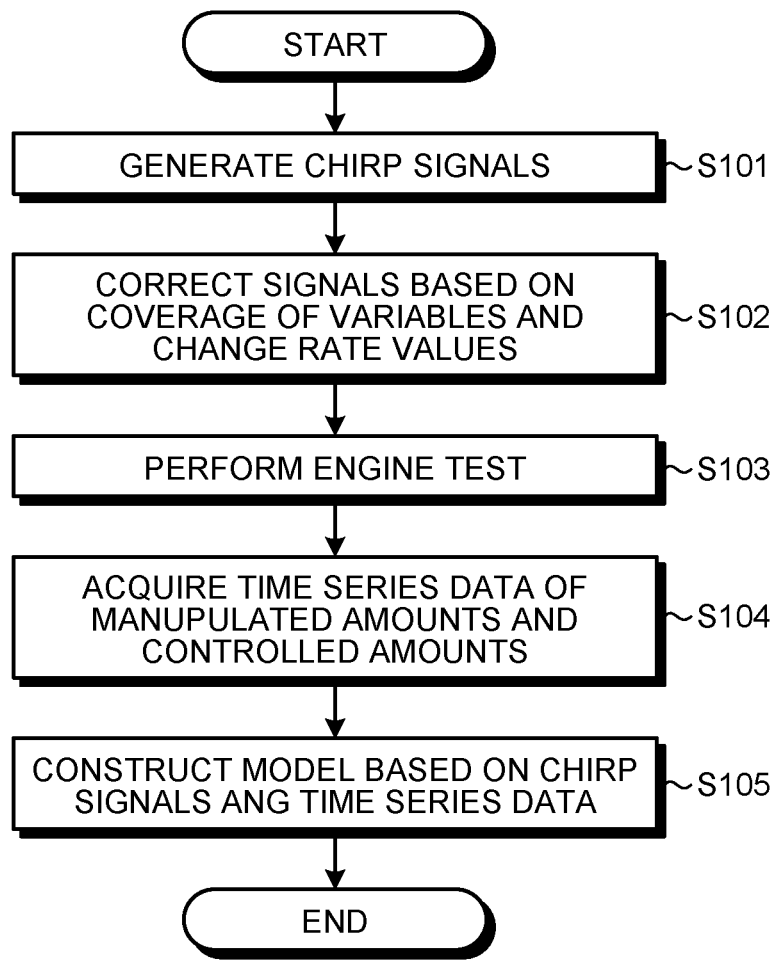
FIG. 9 is a flowchart illustrating the flow of an engine model construction process according to the first embodiment.

Next, the flow of an engine model construction process according to the first embodiment will be described. FIG. 9 is a flowchart illustrating the flow of the engine model construction process according to the first embodiment.

First, as illustrated in FIG. 9, the generation unit 131 of the constructing apparatus 100 generates a Chirp signal for each of manipulated variables, as a test pattern in which each of the manipulated variables used for the engine test is changed with time (Step S101).

Subsequently, the correction unit 132 of the constructing apparatus 100 corrects the Chirp signals generated at Step S101, based on the coverage of the space of the manipulated variables are allowed to take and the coverage of the space of the change rate values of the manipulated variables are allowed to take (Step S102). Furthermore, the correction unit 132 is able to further correct the Chirp signals based on the air excess ratio or the legal limits of the exhaust gas components.

Then, the acquisition unit 133 of the constructing apparatus 100 performs an engine test using the Chirp signals corrected at Step S102 (Step S103), and acquires pieces of time series data of the manipulated amounts of the manipulated variables and the controlled amounts with respect to the manipulated variables (Step S104).

Subsequently, the construction unit 134 of the constructing apparatus 100 constructs a model by performing machine learning on the training data, in which the Chirp signals corrected at Step S102 are adopted as input and the pieces of time series data acquired at Step S104 are adopted as correct answers (Step S105).

After execution of Step S105, the process illustrated in FIG. 9 is terminated, and, with use of the engine model constructed at Step S105, it is possible to predict time series data of the controlled amounts with respect to the manipulated variables in the case where the engine is operated by the Chirp signals. Further, at the time of the engine test, by controlling the engine or the virtual engine using the predicted time series data, it is possible to perform the engine test with high coverage and reduced test man-hours.

Effects

As described above, the constructing apparatus 100 generates test patterns in which a plurality of manipulated variables used for an engine test are changed with time, corrects the test patterns based on the first coverage of the first space of the manipulated variables are allowed to take and the second coverage of the second space of the change rate values of the manipulated variables are allowed to take, acquires pieces of time series data of the manipulated amounts of the manipulated variables and the controlled amounts of the manipulated variables by performing an engine test using the corrected test patterns, and constructs an engine model by performing machine learning on training data in which the corrected test patterns are adopted as input and the pieces of time series data are adopted as correct answers.

With this configuration, it is possible to provide an engine model for performing an engine test with reduced test man-hours. Further, by determining and controlling the manipulated amount of each of the manipulated variables of the engine by sequential optimization using the constructed engine model, it is possible to perform an engine test with high coverage and reduced test man-hours.

Furthermore, the generation process performed by the constructing apparatus 100 includes a process of generating, as the test patterns, Chirp signals that represent temporal changes of the manipulated variables.

With this configuration, it is possible to provide an engine model for performing an engine test with high coverage using the Chirp signals.

Moreover, the construction process performed by the constructing apparatus 100 includes a process of constructing, as the engine model, a machine learning model based on an RNN or an LSTM with two or more intermediate layers.

With this configuration, it is possible to provide an engine model capable of highly accurately predicting the controlled amount with respect to the manipulated amount of each of the manipulated variables of the engine at the time of the engine test.

Furthermore, the constructing apparatus 100 further performs a process of generating a second engine model using a mathematical expression based on physics for calibrating a model parameter of the engine model by using the engine model.

With this configuration, it is possible to provide an engine model that operates on a model predictive controller that determines the manipulated amount of each of the manipulated variables of the engine at the time of the engine test. In addition, by determining the manipulated amount of each of the manipulated variables of the engine at the time of the engine test by using the engine model on the model predictive controller, it is possible to perform an engine test with reduced test man-hours.

Moreover, the constructing apparatus 100 further performs a process of generating the second engine model by linearizing the engine model.

With this configuration, it is possible to provide an engine model that operates on a prediction controller that determines the operation amount of each of the manipulated variables of the engine at the time of the engine test. In addition, by determining the operation amount of each of the manipulated variables of the engine at the time of the engine test by using the engine model on the prediction controller, it is possible to perform an engine test with reduced test man-hours.

Furthermore, the constructing apparatus 100 further performs a process of transmitting the second engine model to a second computer that predicts a controlled amount by using the engine model.

With this configuration, it is possible to predict the operation amount of each of the manipulated variables of the engine at the time of the engine test on the prediction controller, and it is possible to perform an engine test with reduced test man-hours.

Moreover, the constructing apparatus 100 further performs at least one of a process of excluding a region that needs to be avoided by the manipulated variables from the first space and a process of excluding a region that needs to be avoided by the change rate values from the second space.

With this configuration, it is possible to provide an engine model that is constructed by performing learning on training data that is corrected to prevent occurrence of an abnormal state, and that is able to perform a secure engine test at high coverage with reduced test man-hours.

Furthermore, the constructing apparatus 100 further performs a process of correcting the test patterns based on an air excess ratio.

With this configuration, it is possible to provide an engine model that is constructed by performing learning using, as training data, the test patterns that are corrected to prevent occurrence of an abnormal state, and that is able to perform a secure engine test with high coverage and reduced test man-hours.

System

The processing procedures, control procedures, specific names, and information including various kinds of data and parameters illustrated in the above-described document and drawings may be arbitrarily changed unless otherwise specified. Furthermore, specific examples, distributions, values, and the like described in the embodiments are mere examples, and may be arbitrarily changed.

The components of the apparatuses illustrated in the drawings are functionally conceptual and need not necessarily be physically configured in the manner illustrated in the drawings. In other words, specific forms of distribution and integration of the apparatuses are not limited to those illustrated in the drawings. That is, all or part of the apparatuses may be functionally or physically distributed or integrated in arbitrary units depending on various loads or use conditions. For example, the generation unit 131 and the correction unit 132 of the constructing apparatus 100 may be integrated.

Furthermore, all or an arbitrary part of the processing functions performed by the apparatuses may be realized by a CPU and a program analyzed and executed by the CPU, or may be realized by hardware using wired logic.

Hardware

Figure 10:
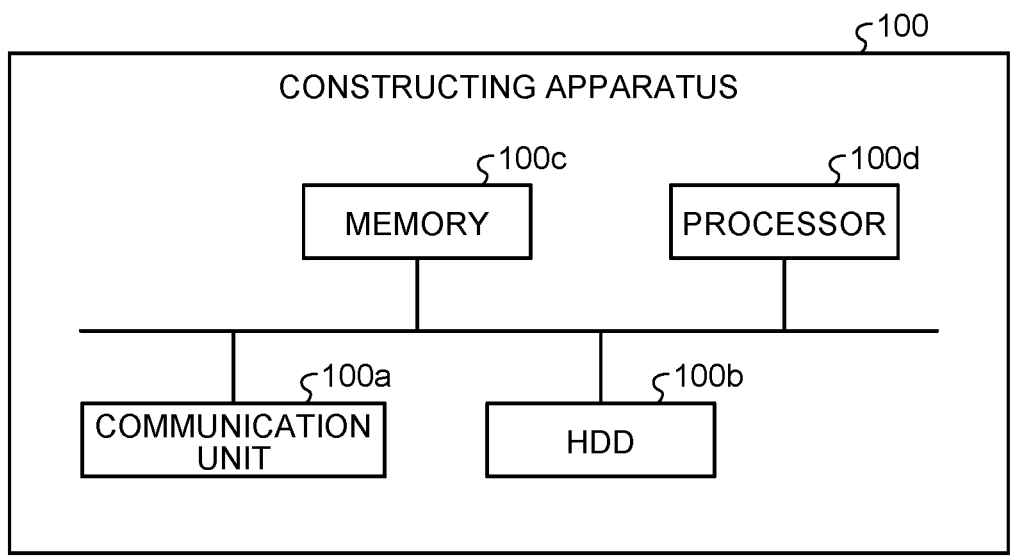
FIG. 10 is a diagram for explaining a hardware configuration example.

A hardware configuration of the constructing apparatus 100 as described above will be described. FIG. 10 is a diagram illustrating a hardware configuration example. As illustrated in FIG. 10, the constructing apparatus 100 includes a communication unit 100a, a hard disk drive (HDD) 100b, a memory 100c, and a processor 100d. Furthermore, all of the units illustrated in FIG. 10 are connected to one another via a bus or the like.

The communication unit 100a is a network interface card or the like and performs communication with other servers. The HDD 100b stores therein a program and a DB for implementing the functions as illustrated in FIG. 1.

The processor 100d reads a program for executing the same process as that of each of the processing units illustrated in FIG. 1 from the HDD 100b or the like, loads the program onto the memory 100c, and operates a process for implementing each of the functions as described above with reference to FIG. 1. For example, the process executes the same function as that of each of the processing units included in the constructing apparatus 100. Specifically, for example, the processor 100d reads a program with the same functions as those of the generation unit 131, the correction unit 132, and the like from the HDD 100b or the like. Further, the processor 100d performs a process for performing the same processes as those of the generation unit 131, the correction unit 132, and the like.

In this manner, the constructing apparatus 100 operates as an information processing apparatus that performs each of the processes by reading and executing the program. Furthermore, the constructing apparatus 100 is able to implement the same functions as those of the embodiments as described above by causing a medium reading apparatus to read the above-described program from a recording medium and executing the read program. Meanwhile, the program described in the other embodiments need not always be executed by the constructing apparatus 100. For example, the present invention is similarly applicable to a case in which a different computer or a different server executes the program or the different computer and the different server execute the program in a cooperative manner.

Meanwhile, the program may be distributed via a network, such as the Internet. Furthermore, the program may be recorded in a computer readable recording medium, such as a hard disk, a flexible disk (FD), a compact disk (CD)-ROM, a magneto-optical disk (MO), or a digital versatile disk (DVD), and may be executed by being read from the reading medium by the computer.

Second Embodiment

While the embodiments of the present invention have been explained above, the present invention may be embodied in various forms other than the embodiments as described above. For example, the constructing apparatus 100 may be configured as described below.

Figure 11:
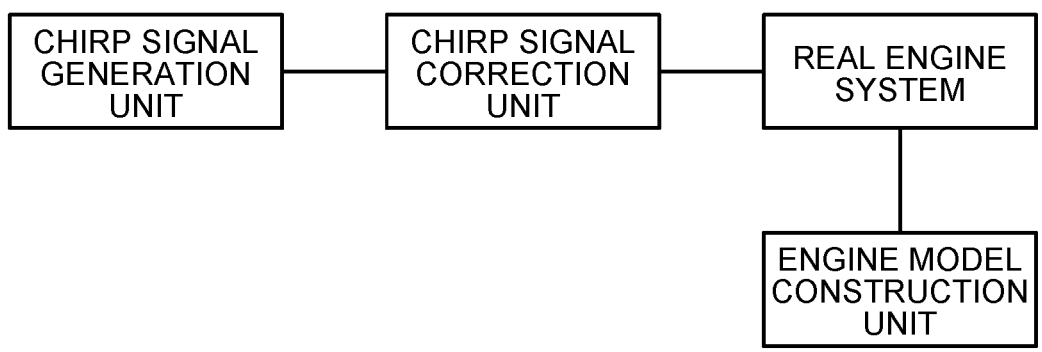
FIG. 11 is a block diagram of the engine model construction.

FIG. 11 is a block diagram illustrating engine model construction. A Chirp signal generation unit, a Chirp signal correction unit, and an engine model construction unit illustrated in FIG. 11 are examples of the generation unit 131, the correction unit 132, and the construction unit 134 of the constructing apparatus 100. Further, a real engine system in FIG. 11 may be an engine real machine, a virtual engine, or an engine model as a machine learning model that is generated using an engine real machine.

Figure 12:
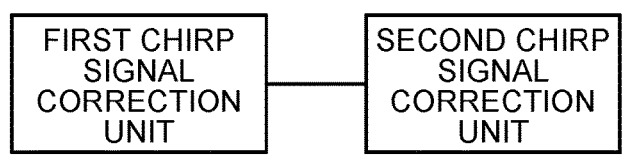
FIG. 12 is a block diagram of a Chirp signal correction unit.

FIG. 12 is a block diagram of the Chirp signal correction unit. As illustrated in FIG. 12, the Chirp signal correction unit illustrated in FIG. 11 may include a first Chirp signal correction unit and a second Chirp signal correction unit.

Figure 13:
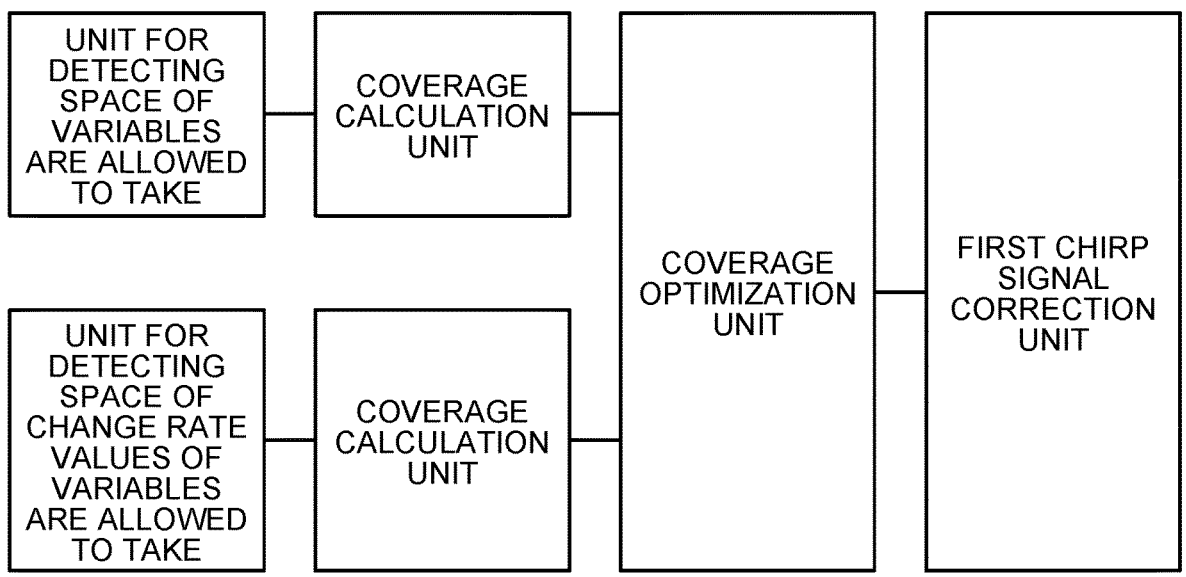
FIG. 13 is a block diagram of a first Chirp signal correction unit.

FIG. 13 is a block diagram of the first Chirp signal correction unit. As illustrated in FIG. 13, the first Chirp signal correction unit in FIG. 12 may include a coverage optimization unit, coverage calculation units, a unit for detecting a space of variables are allowed to take, and a unit for detecting a space of change rate values of variables are allowed to take.

Figure 14:
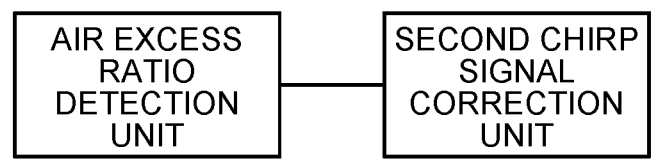
FIG. 14 is a block diagram of a second Chirp signal correction unit.

FIG. 14 is a block diagram of the second Chirp signal correction unit. As illustrated in FIG. 14, the second Chirp signal correction unit in FIG. 12 may include an air excess ratio detection unit.

Figure 15:
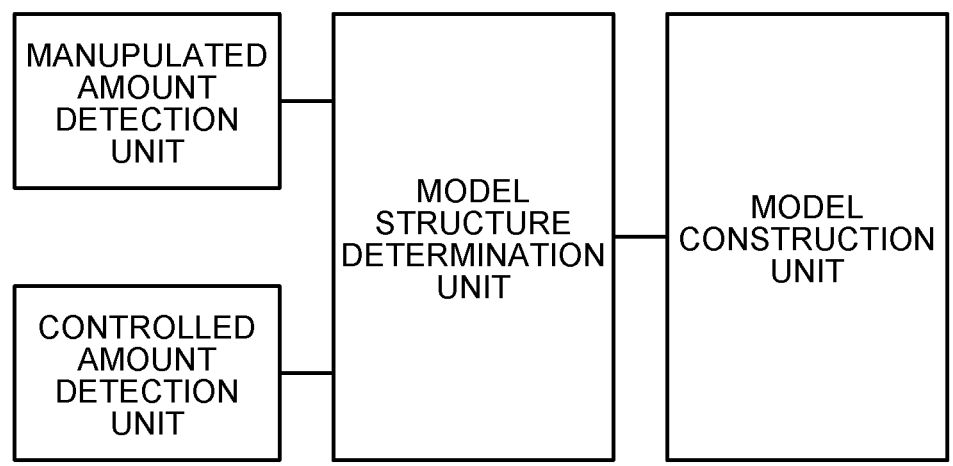
FIG. 15 is a block diagram of the engine model construction unit.

FIG. 15 is a block diagram of the engine model construction unit. As illustrated as a model construction unit in FIG. 12, the engine model construction unit in FIG. 11 may include a model structure determination unit, an operation amount detection unit, and a controlled amount detection unit.

According to one aspect, it is possible to provide an engine model for performing an engine test with reduced test man-hours.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An engine model construction method comprising:
generating test patterns in which a plurality of manipulated variables used for an engine test are changed with time;
correcting the test patterns based on first coverage of a first space of manipulated variables are allowed to take and second coverage of a second space of change rate values of the manipulated variables are allowed to take;
acquiring pieces of time series data of operation amounts of the manipulated variables and controlled amounts with respect to the manipulated variables by performing an engine test using the corrected test patterns; and
constructing a first engine model by performing machine learning on training data in which the corrected test patterns are adopted as input and the pieces of time series data are adopted as correct answers, by a processor.

2. The engine model construction method according to claim 1, wherein the generating includes generating, as the test patterns, Chirp signals that represent temporal changes of the manipulated variables.

3. The engine model construction method according to claim 1, wherein the constructing includes constructing, as the first engine model, a machine learning model based on one of a recurrent neural network (RNN) and a long short term memory (LSTM) with two or more intermediate layers.

4. The engine model construction method according to claim 3, further including generating a second engine model using a mathematical expression based on physics for calibrating a model parameter of the first engine model by using the first engine model.

5. The engine model construction method according to claim 1, further including generating a second engine model by linearizing the first engine model.

6. The engine model construction method according to claim 4, further including transmitting the second engine model to a second computer that predicts a controlled amount by using the first engine model.

7. The engine model construction method according to claim 1, further including at least one of excluding a region that needs to be avoided by the manipulated variables from the first space and excluding a region that needs to be avoided by the change rate values from the second space.

8. The engine model construction method according to claim 1, further including correcting the test patterns based on an air excess ratio.

9. A non-transitory computer-readable recording medium storing therein an engine model construction program that causes a computer to execute a process comprising:
generating test patterns in which a plurality of manipulated variables used for an engine test are changed with time;
correcting the test patterns based on first coverage of a first space of manipulated variables are allowed to take and second coverage of a second space of change rate values of the manipulated variables are allowed to take;
acquiring pieces of time series data of operation amounts of the manipulated variables and controlled amounts with respect to the manipulated variables by performing an engine test using the corrected test patterns; and
constructing a first engine model by performing machine learning on training data in which the corrected test patterns are adopted as input and the pieces of time series data are adopted as correct answers.

10. The non-transitory computer-readable recording medium according to claim 9, wherein the generating includes generating, as the test patterns, Chirp signals that represent temporal changes of the manipulated variables.

11. The non-transitory computer-readable recording medium according to claim 9, wherein the constructing includes constructing, as the first engine model, a machine learning model based on one of a recurrent neural network (RNN) and a long short term memory (LSTM) with two or more intermediate layers.

12. The non-transitory computer-readable recording medium according to claim 11, wherein the process further includes generating a second engine model using a mathematical expression based on physics for calibrating a model parameter of the first engine model, by using the first engine model.

13. The non-transitory computer-readable recording medium according to claim 9, wherein the process further includes generating a second engine model by linearizing the first engine model.

14. The non-transitory computer-readable recording medium according to claim 12, wherein the process further includes transmitting the second engine model to a second computer that predicts a controlled amount by using the first engine model.

15. The non-transitory computer-readable recording medium according to claim 9, wherein the process further includes at least one of excluding a region that needs to be avoided by the manipulated variables from the first space and excluding a region that needs to be avoided by the change rate values from the second space.

16. The non-transitory computer-readable recording medium according to claim 9, wherein the process further includes correcting the test patterns based on an air excess ratio.

17. An engine model constructing apparatus comprising:
a memory; and
a processor coupled to the memory and configured to:
generate test patterns in which a plurality of manipulated variables used for an engine test are changed with time,
correct the test patterns based on first coverage of a first space of manipulated variables are allowed to take and second coverage of a second space of change rate values of the manipulated variables are allowed to take,
acquire pieces of time series data of operation amounts of the manipulated variables and controlled amounts with respect to the manipulated variables by performing an engine test using the corrected test patterns, and
construct a first engine model by performing machine learning on training data in which the corrected test patterns are adopted as input and the pieces of time series data are adopted as correct answers.

18. The engine model constructing apparatus according to claim 17, wherein the processor is further configured to generate, as the test patterns, Chirp signals that represent temporal changes of the manipulated variables.

19. The engine model constructing apparatus according to claim 17, wherein the processor is further configured to construct, as the first engine model, a machine learning model based on one of a recurrent neural network (RNN) and a long short term memory (LSTM) with two or more intermediate layers.

20. The engine model constructing apparatus according to claim 19, wherein the processor is further configured to generate a second engine model using a mathematical expression based on physics for calibrating a model parameter of the first engine model by using the first engine model.

21. The engine model constructing apparatus according to claim 17, wherein the processor is further configured to generate a second engine model by linearizing the first engine model.

22. The engine model constructing apparatus according to claim 20, wherein the processor is further configured to transmit the second engine model to a second computer that predicts a controlled amount by using the first engine model.

23. The engine model constructing apparatus according to claim 17, wherein the processor is further configured to perform at least one of excluding a region that needs to be avoided by the manipulated variables from the first space and excluding a region that needs to be avoided by the change rate values from the second space.

24. The engine model constructing apparatus according to claim 17, wherein the processor is further configured to correct the test patterns based on an air excess ratio.

* * * * *